(12) United States Patent
Nelson et al.

(10) Patent No.: US 11,821,774 B2
(45) Date of Patent: *Nov. 21, 2023

(54) FLOW SENSOR AND METHOD FOR ADJUSTING FLUID FLOW MEASUREMENT

(71) Applicant: Becton, Dickinson and Company, Franklin Lakes, NJ (US)

(72) Inventors: Mark Andrew Nelson, Harrison, NJ (US); Daniel Chenet, Jersey City, NJ (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,527

(22) Filed: Jun. 10, 2022

(65) Prior Publication Data

US 2022/0326057 A1 Oct. 13, 2022

Related U.S. Application Data

(63) Continuation of application No. 17/256,031, filed as application No. PCT/US2019/039736 on Jun. 28, 2019, now Pat. No. 11,385,086.

(Continued)

(51) Int. Cl.
*G01F 1/7084* (2022.01)
*G01F 1/684* (2006.01)
(Continued)

(52) U.S. Cl.
CPC .......... *G01F 1/7084* (2013.01); *G01F 1/6842* (2013.01); *G01F 1/69* (2013.01)

(58) Field of Classification Search
CPC ........ G01F 1/7084; G01F 1/6842; G01F 1/69; G01F 1/6845; G01F 1/6888; G01F 15/02; G01F 1/68
See application file for complete search history.

(56) References Cited

U.S. PATENT DOCUMENTS

| 3,144,769 A | 8/1964 | Francisco, Jr. |
| 3,528,288 A | 9/1970 | Scourtes |

(Continued)

FOREIGN PATENT DOCUMENTS

| DE | 102008055167 A1 | 7/2010 |
| EP | 0897102 A1 | 2/1999 |

(Continued)

OTHER PUBLICATIONS

Ballato, "MEMS Fluid Viscosity Sensor", IEEE Trans Ultras Ferroelectrics and Frequency Control, 2010, vol. 57, pp. 669-676.

(Continued)

*Primary Examiner* — Herbert K Roberts
*Assistant Examiner* — Anthony W Megna Fuentes
(74) *Attorney, Agent, or Firm* — The Webb Law Firm

(57) ABSTRACT

A flow sensor including a fluid flow path, a first sensor configured to determine a first measurement of a thermal diffusivity and/or a viscosity of a fluid in the fluid flow path, a second sensor configured to determine a second measurement of a fluid flow velocity and/or a volumetric flow rate of the fluid in the fluid flow path, and at least one processor configured to adjust the second measurement based on the first measurement. A method including receiving fluid in a fluid flow path of a flow sensor, determining a first measurement of a thermal diffusivity and/or a viscosity of the fluid in the fluid flow path, determining a second measurement of a fluid flow velocity and/or a volumetric flow rate of the fluid in the fluid flow path, and adjusting the second measurement based on the first measurement.

16 Claims, 6 Drawing Sheets

Related U.S. Application Data

(60) Provisional application No. 62/694,647, filed on Jul. 6, 2018.

(51) Int. Cl.
    *G01F 1/69*     (2006.01)
    *G01F 1/688*     (2006.01)
    *G01F 15/02*     (2006.01)
    *G01F 1/68*     (2006.01)

(56) References Cited

U.S. PATENT DOCUMENTS

| | | |
|---|---|---|
| 4,299,336 A | 11/1981 | Studer |
| 4,352,459 A | 10/1982 | Berger et al. |
| 4,398,428 A | 8/1983 | Kato |
| 4,474,180 A | 10/1984 | Angulo |
| 4,542,650 A | 9/1985 | Renken et al. |
| 4,561,438 A | 12/1985 | Bonnet et al. |
| 4,677,858 A | 7/1987 | Ohnhaus |
| 4,788,869 A | 12/1988 | Li |
| 4,944,035 A | 7/1990 | Aagardl et al. |
| 5,048,798 A | 9/1991 | Araki et al. |
| 5,221,282 A | 6/1993 | Wuchinich |
| 5,279,163 A | 1/1994 | D'Antonio et al. |
| 5,463,899 A | 11/1995 | Zemel et al. |
| 5,463,906 A | 11/1995 | Spani et al. |
| 5,515,714 A | 5/1996 | Sultan et al. |
| 5,987,981 A | 11/1999 | Boer |
| 6,155,463 A | 12/2000 | Dentler |
| 6,223,593 B1 | 5/2001 | Kubisiak et al. |
| 6,435,030 B1 | 8/2002 | Gysling et al. |
| 6,619,139 B2 | 9/2003 | Popp |
| 6,629,934 B2 | 10/2003 | Mault et al. |
| 6,725,707 B1 | 4/2004 | Lin et al. |
| 6,981,960 B2 | 1/2006 | Cho et al. |
| 7,018,360 B2 | 3/2006 | Flaherty |
| 7,032,435 B2 | 4/2006 | Hassenflug |
| 7,127,366 B2 | 10/2006 | Repko |
| 7,255,006 B2 | 8/2007 | Spanke et al. |
| 7,264,885 B2 | 9/2007 | Rosen et al. |
| 7,560,494 B2 | 7/2009 | Steinbrenner et al. |
| 7,762,988 B1 | 7/2010 | Vitello |
| 7,782,202 B2 | 8/2010 | Downie et al. |
| 7,882,751 B2 | 2/2011 | Hoecker |
| 7,976,508 B2 | 7/2011 | Hoag |
| 8,544,344 B2 | 10/2013 | Murakami |
| 8,714,030 B1 | 5/2014 | Liu et al. |
| 8,794,082 B2 | 8/2014 | Huang et al. |
| 8,863,589 B2 | 10/2014 | Bitto et al. |
| 8,904,878 B2 | 12/2014 | Wiest et al. |
| 9,541,431 B2 | 1/2017 | Nakano et al. |
| 9,586,013 B2 | 3/2017 | Bai |
| 9,884,152 B2 | 2/2018 | McLoughlin et al. |
| 9,970,794 B2 | 5/2018 | DeKalb |
| 9,976,883 B2 | 5/2018 | DeKalb et al. |
| 9,981,086 B2 | 5/2018 | Cowe et al. |
| 9,983,034 B2 | 5/2018 | DeKalb |
| 2007/0034016 A1 | 2/2007 | Maginnis et al. |
| 2007/0186684 A1 | 8/2007 | Pham |
| 2009/0157040 A1 | 6/2009 | Jacobson et al. |
| 2009/0204005 A1 | 8/2009 | Keast et al. |
| 2009/0234323 A1 | 9/2009 | Bunch et al. |
| 2009/0264768 A1 | 10/2009 | Courtney et al. |
| 2009/0270844 A1 | 10/2009 | Seeley et al. |
| 2010/0063765 A1 | 3/2010 | Carlisle et al. |
| 2010/0237254 A1 | 9/2010 | Mason et al. |
| 2011/0046514 A1 | 2/2011 | Greenwald et al. |
| 2011/0257898 A1 | 10/2011 | Ooishi |
| 2013/0177455 A1 | 7/2013 | Kamen et al. |
| 2014/0033827 A1 | 2/2014 | Satou et al. |
| 2015/0204705 A1 | 7/2015 | Forster et al. |
| 2015/0211904 A1 | 7/2015 | Forster |
| 2016/0084689 A1 | 3/2016 | Smith et al. |
| 2016/0245681 A1 | 8/2016 | Maginnis et al. |
| 2016/0290849 A1 | 10/2016 | Badarlis et al. |
| 2016/0375449 A1 | 12/2016 | Cao et al. |
| 2017/0030873 A1 | 2/2017 | Gellert |
| 2017/0059374 A1 | 3/2017 | DeKalb et al. |
| 2017/0059375 A1 | 3/2017 | DeKalb |
| 2017/0059377 A1 | 3/2017 | DeKalb |
| 2017/0276527 A1 | 9/2017 | Chen et al. |
| 2017/0361017 A1 | 12/2017 | Verma et al. |
| 2018/0180455 A1 | 6/2018 | Nakao et al. |

FOREIGN PATENT DOCUMENTS

| | | |
|---|---|---|
| EP | 2857803 A1 | 4/2015 |
| JP | H01094863 A | 4/1989 |
| JP | H11230799 A | 8/1999 |
| JP | 2001194198 A | 7/2001 |
| JP | 2001355800 A | 12/2001 |
| JP | 2002221440 A | 8/2002 |
| JP | 2003014513 A | 1/2003 |
| JP | 2004537328 A | 12/2004 |
| JP | 2006275686 A | 10/2006 |
| JP | 2013104838 A | 5/2013 |
| JP | 2014160082 A | 9/2014 |
| JP | 2015017978 A | 1/2015 |
| JP | 2017129470 A | 7/2017 |
| WO | 0209795 A2 | 2/2002 |
| WO | 2011126895 A2 | 10/2011 |
| WO | 2014016315 A1 | 1/2014 |
| WO | 2014016316 A1 | 1/2014 |

OTHER PUBLICATIONS

Beigelbeck et al., "A novel measurement method for the thermal properties of liquids by utilizing a bridge-based micromachined sensor", Meas. Sci. Technology, 2011, vol. 22, pp. 1-10.

Beigelbeck et al., "From Basic Flow Property to MEMS Multiparameter Sensors", Sensor, 2015, pp. 216-221.

Bindels, "Dependency of the fluids thermal properties on thermal flow sensor", report on Masters Internship at Philips Research, BMTE 09.46 Eindhoven University of Technology, 2009, pp. 1-37.

Gustafsson et al., "Transient hot-strip method for simultaneously measuring thermal conductivity and thermal diffusivity of solids and fluids", J. Phys. D: Appl. Phys., 1979, vol. 12, pp. 1411-1421.

Hardy et al., "Empirical Correlations for Thermal Flowmeters Covering a Wide Range of Thermal-Physical Properties", National Conference of Standard Labs, 1999, Workshop and Symposium, Charlotte, NC, pp. 1-14.

Hepp et al., "Measuring Flow Velocity and Gas Concentration in Binary Gas Mixtures Using Thermal Sensors", Sensor + Test Conferences, 2011, pp. 84-88.

Hepp et al., "Design and Characterization of a Thermal Sensor Achieving Simultaneous Measurement of Thermal Conductivity and Flow Speed", Transducers 2015, pp. 1065-1068.

Hepp et al., "Gas Concentration and Flow Speed Measurement by Thermal Excitation Using One Single Chip", Procedia Engineering, 2015, vol. 120, pp. 298-301.

Hepp et al., "Flow rate independent sensing of thermal conductivity in a gas stream by a thermal MEMS-sensor—Simulation and experiments", Sensors and Actuators A: Physical, 2017, vol. 253, pp. 136-145.

Kuo et al., "Miromachined Thermal Flow Sensors—A Review", Micromachines, 2012, vol. 3, pp. 550-573.

Lin et al., "A Methodology for Simultaneously Measuring Thermal Conductivity and Viscosity of Refrigerant Mixtures", International Refrigeration and Air Conditioning Conference, 1994, pp. 43-48.

Meng, "MEMS Technology and Devices for a Micro Fluid Dosing System", 2003, Doctoral Thesis, California Institute of Technology, Pasadena, CA, pp. 1-170.

Puchades, "A Thermally Actuated MEMS Viscosity Sensor", RIT-Microsystems Engineering, 2009, pp. 1-53.

Roder, "A Transient Hot Wire Thermal Conductivity Apparatus for Fluids", Journal of Research of the National Bureau of Standards, 1981, vol. 86:5, pp. 457-493.

(56) References Cited

OTHER PUBLICATIONS

Romero et al., "Simultaneous flow and thermal conductivity measurement of gases utilizing a calorimetric flow sensor", Sensors and Actuators A: Physical, 2013, vol. 203, pp. 225-233.
Schmitt et al., "Novel multiparameter microsensor for determination of fluid mixture properties and flow rate", Procedia Engineering, 2015, vol. 120, pp. 185-188.
Zhu et al., "Modelling and simulation of a thermal flow sensor for determining the flow speed and thermal properties of binary gas mixtures", Procedia Engineering, 2016, vol. 168, pp. 1028-1031.
Smith et al., "A MEMS viscometer for unadulterated human blood", Measurement, 2020, pp. 1-33.
Yoshiaki et al., "Micro Flow Sensor for Microreactor", Microtechnology, 2009, No. 47, pp. 37-40.

FLOW SENSOR AND METHOD FOR ADJUSTING FLUID FLOW MEASUREMENT

CROSS-REFERENCE TO RELATED APPLICATION

This application is a continuation of U.S. patent application Ser. No. 17/256,031 entitled "Flow Sensor and Method for Adjusting Fluid Flow Measurement", filed Jun. 28, 2019, which is the United States national phase of International Application No. PCT/US2019/039736 filed Jun. 28, 2019, and claims priority to U.S. Provisional Application Ser. No. 62/694,647 entitled "Flow Sensor and Method for Adjusting Fluid Flow Measurement", filed Jul. 6, 2018, the disclosures of which are hereby incorporated by reference in their entirety.

BACKGROUND OF THE INVENTION

1. Field of the Invention

This disclosure relates generally to flow sensors, and in one particular embodiment, to a flow sensor and a method for adjusting a fluid flow measurement.

2. Technical Considerations

Thermal properties and viscosities of fluids (e.g., medication fluids, IV therapy fluids, blood, etc.) vary significantly. The variation in thermal properties and viscosities impacts an accuracy of calorimetric or dual-mode calorimetric/thermal time-of-flight flow sensors. For example, a calorimetric or dual-mode calorimetric/thermal time-of-flight flow sensor is typically calibrated for measurement with a particular fluid, and use of the calorimetric or dual-mode calorimetric/thermal time-of-flight flow sensor for measurement with a different fluid for which the flow sensor is not calibrated impacts an accuracy of a fluid flow velocity and/or a volumetric flow rate measured by the flow sensor.

SUMMARY OF THE INVENTION

Accordingly, provided are improved systems, devices, products, apparatus, and/or methods for adjusting a fluid flow measurement.

According to a non-limiting embodiment or aspect, provided is a flow sensor comprising: a fluid flow path; a first sensor configured to determine a first measurement of at least one of a thermal diffusivity of a fluid in the fluid flow path and a viscosity of the fluid in the fluid flow path; a second sensor configured to determine a second measurement of at least one of a fluid flow velocity of the fluid in the fluid flow path and a volumetric flow rate of the fluid in the fluid flow path; and at least one processor configured to adjust the second measurement based on the first measurement.

In some non-limiting embodiments or aspects, the first sensor includes a resistive heater layer extending in a direction parallel to the fluid flow path between a first resistive temperature detector layer and a second resistive temperature detector layer extending in the direction parallel to the fluid flow path, and the second sensor includes another resistive heater layer extending in a direction perpendicular to the fluid flow path between another first resistive temperature detector layer and another second resistive temperature detector layer extending in the direction perpendicular to the fluid flow path.

In some non-limiting embodiments or aspects, a spacing between the resistive heater layer and the first resistive temperature detector layer and the second resistive temperature detector layer in the first sensor is less than a spacing between the another resistive heater layer and the another first resistive temperature detector layer and the another second resistive temperature detector layer in the second sensor.

In some non-limiting embodiments or aspects, the second sensor is configured to determine the second measurement based on at least one of a calorimetric mode and a thermal time-of-flight mode.

In some non-limiting embodiments or aspects, the at least one processor is configured to adjust the second measurement by controlling the second sensor to switch, based on the first measurement, between (i) determining the second measurement based on only the calorimetric mode and (ii) determining the second measurement based on only the thermal time-of-flight mode.

In some non-limiting embodiments or aspects, the at least one processor is configured to adjust the second measurement by controlling the second sensor to switch, based on the first measurement, between (i) determining the second measurement based on only one of the calorimetric mode and the thermal time-of-flight mode and (ii) determining the second measurement based on each of the calorimetric mode and the thermal time-of-flight mode.

In some non-limiting embodiments or aspects, the second sensor is calibrated to determine the second measurement for a first type of the fluid, wherein the fluid includes a second type of the fluid different than the first type of the fluid, and wherein the at least one processor is configured to adjust the second measurement based on a ratio of the at least one of the thermal diffusivity of the fluid in the fluid flow path and the viscosity of the fluid in the fluid flow path to at least one of a thermal diffusivity of the first type of the fluid and a viscosity of the first type of the fluid.

In some non-limiting embodiments or aspects, the at least one processor is configured to: receive an identification of a type of the fluid to be received in the fluid flow path, wherein the identification is associated with an adjustment factor; determine, based on the first measurement, a change in the type of the fluid in the fluid flow path; and in response to determining the change in the type of the fluid in the fluid flow path, adjust the second measurement based on the adjustment factor.

In some non-limiting embodiments or aspects, the flow sensor further comprises a third sensor configured to identify the type of the fluid in the fluid flow path and provide the identification of the type of the fluid in the fluid flow path.

In some non-limiting embodiments or aspects, the second sensor is spaced apart from the first sensor in a fluid flow direction of the fluid flow path.

According to a non-limiting embodiment or aspect, provided is a method comprising: receiving fluid in a fluid flow path of a flow sensor; determining, with a first sensor of the flow sensor, a first measurement of at least one of a thermal diffusivity of the fluid in the fluid flow path and a viscosity of the fluid in the fluid flow path; determining, with a second sensor of the flow sensor, a second measurement of at least one of a fluid flow velocity of the fluid in the fluid flow path and a volumetric flow rate of the fluid in the fluid flow path; and adjusting, with at least one processor, the second measurement based on the first measurement.

In some non-limiting embodiments or aspects, the first sensor includes a resistive heater layer extending in a direction parallel to the fluid flow path between a first resistive temperature detector layer and a second resistive temperature detector layer extending in the direction parallel to the fluid flow path, and the second sensor includes another resistive heater layer extending in a direction perpendicular to the fluid flow path between another first resistive temperature detector layer and another second resistive temperature detector layer extending in the direction perpendicular to the fluid flow path.

In some non-limiting embodiments or aspects, a spacing between the resistive heater layer and the first resistive temperature detector layer and the second resistive temperature detector layer in the first sensor is less than a spacing between the another resistive heater layer and the another first resistive temperature detector layer and the another second resistive temperature detector layer in the second sensor.

In some non-limiting embodiments or aspects, determining the second measurement is based on at least one of a calorimetric mode of the second sensor and a thermal time-of-flight mode of the second sensor.

In some non-limiting embodiments or aspects, adjusting the second measurement includes controlling the second sensor to switch, based on the first measurement, between (i) determining the second measurement based on only the calorimetric mode and (ii) determining the second measurement based on only the thermal time-of-flight mode.

In some non-limiting embodiments or aspects, adjusting the second measurement includes controlling the second sensor to switch, based on the first measurement, between (i) determining the second measurement based on only one of the calorimetric mode and the thermal time-of-flight mode and (ii) determining the second measurement based on each of the calorimetric mode and the thermal time-of-flight mode.

In some non-limiting embodiments or aspects, the second sensor is calibrated to determine the second measurement for a first type of the fluid, wherein the fluid includes a second type of the fluid different than the first type of the fluid, and wherein adjusting the second measurement is based on a ratio of the at least one of the thermal diffusivity of the fluid in the fluid flow path and the viscosity of the fluid in the fluid flow path to at least one of a thermal diffusivity of the first type of the fluid and a viscosity of the first type of the fluid.

In some non-limiting embodiments or aspects, the method further comprises: receiving, with the at least one processor, an identification of a type of the fluid to be received in the fluid flow path, wherein the identification is associated with an adjustment factor; determining, with the at least one processor, based on the first measurement, a change in the type of the fluid in the fluid flow path; and in response to determining the change in the type of the fluid in the fluid flow path, adjusting, with the at least one processor, the second measurement based on the adjustment factor.

In some non-limiting embodiments or aspects, the method further comprises: identifying, with a third sensor, the type of the fluid in the fluid flow path; and providing, with the third sensor, the identification of the type of the fluid in the fluid flow path.

In some non-limiting embodiments or aspects, the second sensor is spaced apart from the first sensor in a fluid flow direction of the fluid flow path.

Further embodiments or aspects are set forth in the following numbered clauses:

Clause 1. A flow sensor comprising: a fluid flow path; a first sensor configured to determine a first measurement of at least one of a thermal diffusivity of a fluid in the fluid flow path and a viscosity of the fluid in the fluid flow path; a second sensor configured to determine a second measurement of at least one of a fluid flow velocity of the fluid in the fluid flow path and a volumetric flow rate of the fluid in the fluid flow path; and at least one processor configured to adjust the second measurement based on the first measurement.

Clause 2. The flow sensor of clause 1, wherein the first sensor includes a resistive heater layer extending in a direction parallel to the fluid flow path between a first resistive temperature detector layer and a second resistive temperature detector layer extending in the direction parallel to the fluid flow path, and wherein the second sensor includes another resistive heater layer extending in a direction perpendicular to the fluid flow path between another first resistive temperature detector layer and another second resistive temperature detector layer extending in the direction perpendicular to the fluid flow path.

Clause 3. The flow sensor of any of clauses 1 and 2, wherein a spacing between the resistive heater layer and the first resistive temperature detector layer and the second resistive temperature detector layer in the first sensor is less than a spacing between the another resistive heater layer and the another first resistive temperature detector layer and the another second resistive temperature detector layer in the second sensor.

Clause 4. The flow sensor of any of clauses 1-3, wherein the second sensor is configured to determine the second measurement based on at least one of a calorimetric mode and a thermal time-of-flight mode.

Clause 5. The flow sensor of any of clauses 1-4, wherein the at least one processor is configured to adjust the second measurement by controlling the second sensor to switch, based on the first measurement, between (i) determining the second measurement based on only the calorimetric mode and (ii) determining the second measurement based on only the thermal time-of-flight mode.

Clause 6. The flow sensor of any of clauses 1-5, wherein the at least one processor is configured to adjust the second measurement by controlling the second sensor to switch, based on the first measurement, between (i) determining the second measurement based on only one of the calorimetric mode and the thermal time-of-flight mode and (ii) determining the second measurement based on each of the calorimetric mode and the thermal time-of-flight mode.

Clause 7. The flow sensor of any of clauses 1-6, wherein the second sensor is calibrated to determine the second measurement for a first type of the fluid, wherein the fluid includes a second type of the fluid different than the first type of the fluid, and wherein the at least one processor is configured to adjust the second measurement based on a ratio of the at least one of the thermal diffusivity of the fluid in the fluid flow path and the viscosity of the fluid in the fluid flow path to at least one of a thermal diffusivity of the first type of the fluid and a viscosity of the first type of the fluid.

Clause 8. The flow sensor of any of clauses 1-7, wherein the at least one processor is configured to: receive an identification of a type of the fluid to be received in the fluid flow path, wherein the identification is associated with an adjustment factor; determine, based on the first measurement, a change in the type of the fluid in the fluid flow path; and in response to determining the change in the type of the fluid in the fluid flow path, adjust the second measurement based on the adjustment factor.

Clause 9. The flow sensor of any of clauses 1-8, further comprising: a third sensor configured to identify the type of the fluid in the fluid flow path and provide the identification of the type of the fluid in the fluid flow path.

Clause 10. The flow sensor of any of clauses 1-9, wherein the second sensor is spaced apart from the first sensor in a fluid flow direction of the fluid flow path.

Clause 11. A method comprising: receiving fluid in a fluid flow path of a flow sensor; determining, with a first sensor of the flow sensor, a first measurement of at least one of a thermal diffusivity of the fluid in the fluid flow path and a viscosity of the fluid in the fluid flow path; determining, with a second sensor of the flow sensor, a second measurement of at least one of a fluid flow velocity of the fluid in the fluid flow path and a volumetric flow rate of the fluid in the fluid flow path; and adjusting, with at least one processor, the second measurement based on the first measurement.

Clause 12. The method of clause 11, wherein the first sensor includes a resistive heater layer extending in a direction parallel to the fluid flow path between a first resistive temperature detector layer and a second resistive temperature detector layer extending in the direction parallel to the fluid flow path, and wherein the second sensor includes another resistive heater layer extending in a direction perpendicular to the fluid flow path between another first resistive temperature detector layer and another second resistive temperature detector layer extending in the direction perpendicular to the fluid flow path.

Clause 13. The method of any of clauses 11 and 12, wherein a spacing between the resistive heater layer and the first resistive temperature detector layer and the second resistive temperature detector layer in the first sensor is less than a spacing between the another resistive heater layer and the another first resistive temperature detector layer and the another second resistive temperature detector layer in the second sensor.

Clause 14. The method of any of clauses 11-13, wherein determining the second measurement is based on at least one of a calorimetric mode of the second sensor and a thermal time-of-flight mode of the second sensor.

Clause 15. The method of any of clauses 11-14, wherein adjusting the second measurement includes controlling the second sensor to switch, based on the first measurement, between (i) determining the second measurement based on only the calorimetric mode and (ii) determining the second measurement based on only the thermal time-of-flight mode.

Clause 16. The method of any of clauses 11-15, wherein adjusting the second measurement includes controlling the second sensor to switch, based on the first measurement, between (i) determining the second measurement based on only one of the calorimetric mode and the thermal time-of-flight mode and (ii) determining the second measurement based on each of the calorimetric mode and the thermal time-of-flight mode.

Clause 17. The method of any of clauses 11-16, wherein the second sensor is calibrated to determine the second measurement for a first type of the fluid, wherein the fluid includes a second type of the fluid different than the first type of the fluid, and wherein adjusting the second measurement is based on a ratio of the at least one of the thermal diffusivity of the fluid in the fluid flow path and the viscosity of the fluid in the fluid flow path to at least one of a thermal diffusivity of the first type of the fluid and a viscosity of the first type of the fluid.

Clause 18. The method of any of clauses 11-17, further comprising: receiving, with the at least one processor, an identification of a type of the fluid to be received in the fluid flow path, wherein the identification is associated with an adjustment factor; determining, with the at least one processor, based on the first measurement, a change in the type of the fluid in the fluid flow path; and in response to determining the change in the type of the fluid in the fluid flow path, adjusting, with the at least one processor, the second measurement based on the adjustment factor.

Clause 19. The method of any of clauses 11-18, further comprising: identifying, with a third sensor, the type of the fluid in the fluid flow path; and providing, with the third sensor, the identification of the type of the fluid in the fluid flow path.

Clause 20. The method of any of clauses 11-19, wherein the second sensor is spaced apart from the first sensor in a fluid flow direction of the fluid flow path.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments or aspects that are illustrated in the accompanying schematic figures, in which.

DETAILED DESCRIPTION OF THE INVENTION

Figure 1A:
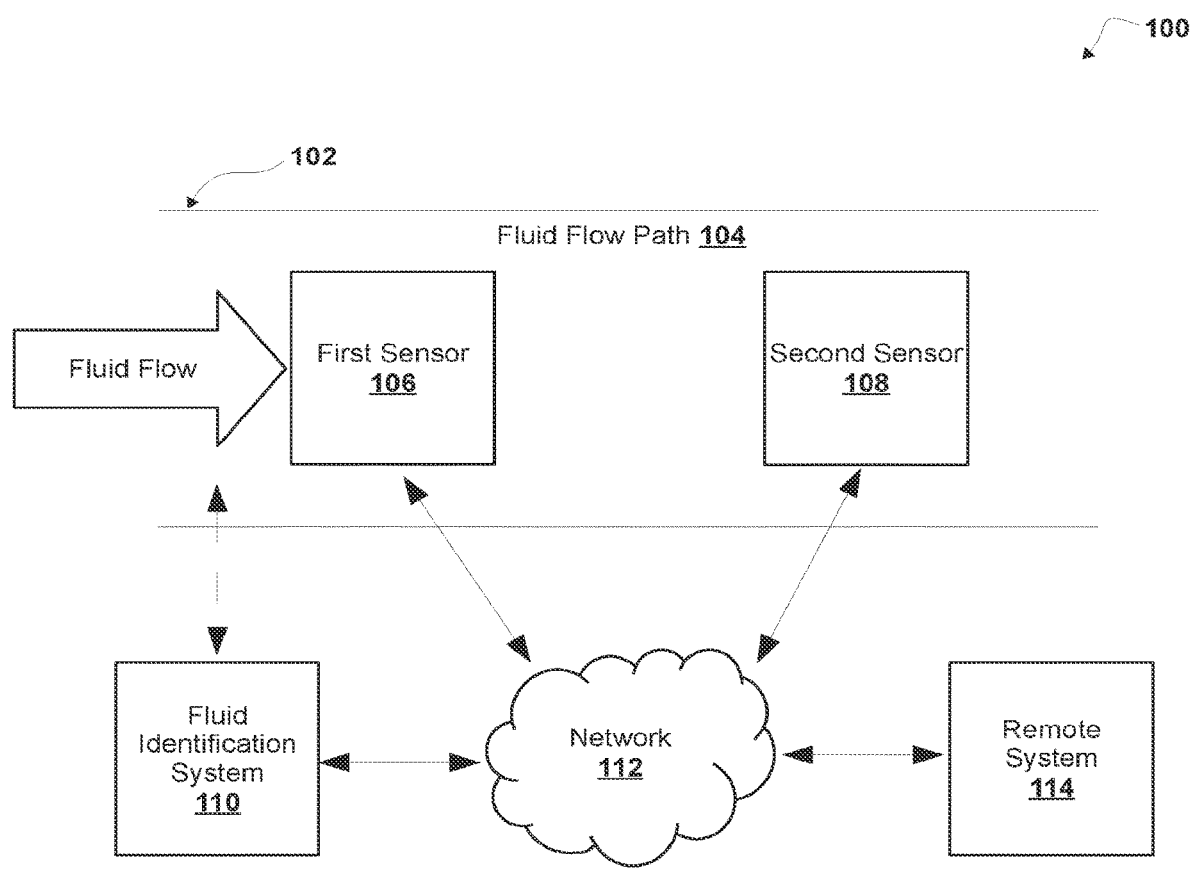
FIG. 1A is a diagram of a non-limiting embodiment or aspect of an environment in which systems, devices, products, apparatus, and/or methods, described herein, may be implemented according to the principles of the present invention.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects of the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible. It will be appreciated that numerous other arrangements are possible.

As used herein, the term "server" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present invention are directed to systems, devices, products, apparatus, and/or methods for adjusting a fluid flow measurement. In some non-limiting embodiments or aspects, a flow sensor may include a fluid flow path; a first sensor configured to determine a first measurement of at least one of a thermal diffusivity of a fluid in the fluid flow path and a viscosity of the fluid in the fluid flow path; a second sensor configured to determine a second measurement of at least one of a fluid flow velocity of the fluid in the fluid flow path and a volumetric flow rate of the fluid in the fluid flow path; and at least one processor configured to adjust the second measurement based on the first measurement. In some non-limiting embodiments or aspects, a method may include receiving fluid in a fluid flow path of a flow sensor; determining, with a first sensor of the flow sensor, a first measurement of at least one of a thermal diffusivity of the fluid in the fluid flow path and a viscosity of the fluid in the fluid flow path; determining, with a second sensor of the flow sensor, a second measurement of at least one of a fluid flow velocity of the fluid in the fluid flow path and a volumetric flow rate of the fluid in the fluid flow path; and adjusting, with at least one processor, the second measurement based on the first measurement.

In this way, a thermal property measurement and/or a viscosity measurement is used to adjust or correct calorimetric and/or thermal time-of-flight flow velocity measurements, which enables a flow sensor to more accurately determine flow velocity and/or volumetric flow rate of fluids with thermal diffusivities and/or viscosities different than that for which the flow sensor is calibrated. Accordingly, embodiments or aspects of the present invention may enable more accurate real-time measurement of dispensed volume of a fluid (e.g., dispensed volume of a medication fluid to a patient, etc.).

Referring now to FIG. 1A, FIG. 1A is a diagram of an example environment 100 in which devices, systems, and/or methods, described herein, may be implemented. As shown in FIG. 1, environment 100 includes flow sensor 102, fluid identification system 110, network 112, and remote system 114. Flow sensor 102, fluid identification system 110, and remote system 114 may interconnect (e.g., establish a connection to communicate, etc.) via wired connections, wireless connections, or a combination of wired and wireless connections.

Flow sensor 102 may include fluid flow path 104, first sensor 106, and second sensor 108. Fluid flow path 104 may include a wall defining a flow channel for fluid. For example, fluid flow path 104 may include a cylindrical flow path having a radius R, a flow path with a square cross-section, a flow path with a rectangular cross-section, and/or the like. In some non-limiting embodiments or aspects, first sensor 106 and/or second sensor 108 are located within fluid flow path 104. For example, first sensor 106 and/or second sensor 108 can be connected to an inside surface of the wall defining the flow channel of fluid flow path 104 (e.g., at an edge of the flow channel, etc.). First sensor 106 and second sensor 108 may interconnect (e.g., establish a connection to communicate, etc.) via a wired connection, a wireless connection, or a combination of a wired and a wireless connection.

In some non-limiting embodiments or aspects, second sensor 108 is spaced apart from first sensor 106 in a fluid flow direction of fluid flow path 104. For example, in an implementation of a non-limiting embodiment or aspect of flow sensor 102 in which fluid flows from left to right in fluid flow path 104 as shown in FIG. 1A, second sensor 108 may be located to the right of first sensor 106. As an example, fluid in fluid flow path 104 may flow over or past first sensor 106 before the fluid in fluid flow path 104 flows over or past second sensor 108.

First sensor 106 may include one or more devices capable of receiving information from and/or communicating information to second sensor 108, fluid identification system 110, and/or remote system 114 via network 112. In some non-limiting embodiment or aspects, first sensor 106 is configured to determine a first measurement of at least one of a thermal diffusivity of a fluid in fluid flow path 104 and a viscosity of the fluid in fluid flow path 104.

Figure 1B:
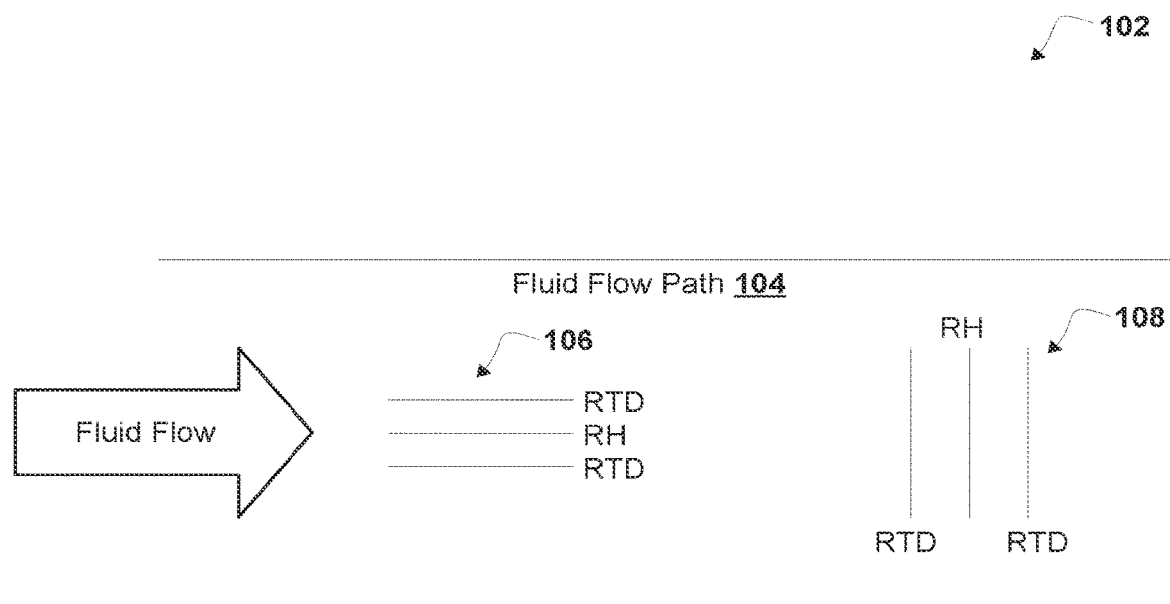
FIG. 1B is a diagram of a non-limiting embodiment or aspect of components of a flow sensor of FIG. 1A.

In some non-limiting embodiments or aspects, first sensor 106 includes a thermal diffusivity measurement sensor or chip configured to measure a thermal diffusivity of a fluid in fluid flow path 104. For example, in an implementation of a non-limiting embodiment or aspect of flow sensor 102 as shown in FIG. 1B, first sensor 106 may include a resistive heater (RH) layer extending in a direction parallel to fluid flow path 104 between a first resistive temperature detector (RTD) layer or thermopile and a second RTD layer or thermopile extending in the direction parallel to fluid flow path 104 (e.g., a RH layer equally spaced from the first RTD layer and the second RTD layer, etc.). As an example, first sensor 106 can pulse, modulate, or continuously operate the RH layer and sense or measure a temperature with the RTD layers or thermopiles to determine the first measurement including the thermal diffusivity of a fluid in fluid flow path 104 (e.g., to provide a signal which is interpreted to determine the thermal diffusivity, etc.). In such an example, first sensor 106 may be located in a substantially no-flow environment within fluid flow path 104 due to first sensor 106 (e.g., the RH layer and first and second RTD layers of first sensor 106, etc.) being oriented parallel to the flow of the fluid, which enables a heat pulse from the RH layer to transfer to and/or be detected by the first and second RTD layers or thermophiles before the flow of the fluid in fluid flow path 104 carries the heat pulse beyond or past the first and second RTD layers or thermopiles of first sensor 106.

In some non-limiting embodiments or aspects, first sensor 106 includes an in situ fluid thermal property measurement apparatus configured to measure a thermal diffusivity of a fluid in fluid flow path 104, such as a transient hot wire thermal conductivity measurement sensor, a bridge-based micromachined sensor, a transient hot-strip sensor, and/or the like as described in Hans Roder, "A Transient Hot Wire Thermal Conductivity Apparatus for Fluids", Journal of Research of the National Bureau of Standards, Vol. 86, No. 5, September-October 1981; S. Gustaffson et al., "Transient hot-strip method for simultaneously measuring thermal conductivity and thermal diffusivity of solids and fluids", J. Phys. D: Appl. Phys., Vol 12, p 1411 (1979); and R. Beigelbeck et al., "A Novel Measurement Method for the Thermal Properties of Liquids by utilizing a bridge-based micromachined sensor". Meas. Sci. Technology, Vol. 22, pp 105407 (2011), each of which is hereby incorporated by reference in its entirety.

In some non-limiting embodiments or aspects, first sensor 106 includes a viscosity measurement sensor or chip configured to measure a viscosity of a fluid in fluid flow path 104. For example, first sensor 106 may include a MEMs viscosity measurement sensor or chip, such as described in A Ballato, "MEMS Fluid Viscosity Sensor", IEEE Trans Ultras Ferroelectr Freq Control 2010, vol 57, pp 669-76, the entire contents of which is hereby incorporated by reference.

Second sensor 108 may include one or more devices capable of receiving information from and/or communicating information to first sensor 106, fluid identification system 110, and/or remote system 114 via network 112. In some non-limiting embodiments or aspects, second sensor 108 is configured to determine a second measurement of at least one of a fluid flow velocity of the fluid in fluid flow path 104 and a volumetric flow rate of the fluid in the fluid flow path 104. In some non-limiting embodiments or aspects, second sensor 108 is calibrated to determine the second measurement for a first type of the fluid, and the fluid in fluid flow path 104 includes a second type of the fluid different than the first type of the fluid. In some non-limiting embodiments or aspects, second sensor 108 is configured to receive the first measurement from first sensor 106 and adjust the second measurement based on the first measurement. In some non-limiting embodiments or aspects, first sensor 106 is configured to receive the second measurement from second sensor 108 and adjust the second measurement based on the first measurement.

In some non-limiting embodiments or aspects, second sensor 108 includes a calorimetric or dual-mode calorimetric/thermal time-of-flight sensor or chip. For example, second sensor 108 may include a MEMS time-of-flight thermal mass flow meter as described in U.S. Pat. No. 8,794,082 to Huang et al., and/or a MEMs device as described in Ellis Meng, "MEMS Technology and Devices for a Micro Fluid Dosing System", Doctoral Thesis, California Institute of Technology, 2003, the entire contents of each of which is hereby incorporated by reference. As an example, referring again to FIG. 1B, second sensor 108 may include a RH layer extending in a direction perpendicular to fluid flow path 104 between a first RTD layer or thermopile and a second RTD layer or thermopile extending in the direction perpendicular to fluid flow path 104. In such an example, second sensor 108 can pulse, modulate, or continuously operate the RH layer and sense or measure a temperature variation with the RTD layers or thermopiles to determine the second measurement of at least one of a fluid flow velocity of the fluid in fluid flow path 104 and a volumetric flow rate of the fluid in the fluid flow path 104 (e.g., to provide a signal which is interpreted to determine the fluid flow velocity and/or the volumetric flow rate, etc.) according to the calibration of second sensor 108.

In some non-limiting embodiments or aspects, as shown in FIG. 1B, a spacing between the RH layer and the first RTD layer and the second RTD layer in first sensor 106 is less than a spacing between the RH layer and the first RTD layer and the second RTD layer in second sensor 108. For example, use of calorimetric or dual-mode calorimetric/ thermal time-of-flight sensors or chips as described herein for calorimetric mode flow measurement technology functions demonstrates that these calorimetric sensors or chips have a sufficient sensitivity to measure a thermal diffusivity at a substantially zero flow as described herein. As an example, a calorimetric or dual-mode calorimetric/thermal time-of-flight sensor or chip configured or implemented as a thermal diffusivity measurement chip (e.g., as first sensor 106) may have a significantly smaller spacing between the RH layer and the RTD layers or thermopiles than a calorimetric or dual-mode calorimetric/thermal time-of-flight sensor or chip configured or implemented as a flow velocity measurement chip (e.g., as second sensor 108).

Fluid identification system 110 may include one or more devices capable of receiving information from and/or communicating information to first sensor 106, second sensor 108, and/or remote system 114 via network 112. In some non-limiting embodiments or aspects, fluid identification system 110 includes a fluid identification sensor configured to identify a type of a fluid in fluid flow path 104 and provide an identification of the type of the fluid in fluid flow path 104. In some non-limiting embodiments or aspects, fluid identification system 110 is incorporated or implemented in flow sensor 102. For example, flow sensor 102 may include a fluid identification sensor configured to identify a type of fluid in fluid flow path 104 and provide an identification of the type of the fluid in fluid flow path 104.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, a short range wireless communication network (e.g., a Bluetooth network, a near field communication (NFC) network, etc.) and/or the like, and/or a combination of these or other types of networks.

Remote system 114 may include one or more devices capable of receiving information from and/or communicating information to first sensor 106, second sensor 108, and/or fluid identification system 110 via network 112. In some non-limiting embodiments or aspects, remote system 114 is in communication with a data storage device, which may be local or remote to remote system 114. In some non-limiting embodiments or aspects, remote system 114 is capable of receiving information from, storing information in, communicating information to, or searching information stored in the data storage device. In some non-limiting embodiments or aspects, remote system 114 is configured to receive the first measurement from first sensor 106 and the second measurement from second sensor 108 and adjust the second measurement based on the first measurement.

The number and arrangement of devices and networks shown in FIG. 1A are provided as an example. There may be additional devices and/or networks, fewer devices and/or networks, different devices and/or networks, or differently arranged devices and/or networks than those shown in FIG. 1A. Furthermore, two or more devices shown in FIG. 1A may be implemented within a single device, or a single device shown in FIG. 1A may be implemented as multiple, distributed devices. Additionally, or alternatively, a set of devices (e.g., one or more devices) of environment 100 may perform one or more functions described as being performed by another set of devices of environment 100.

Figure 2:
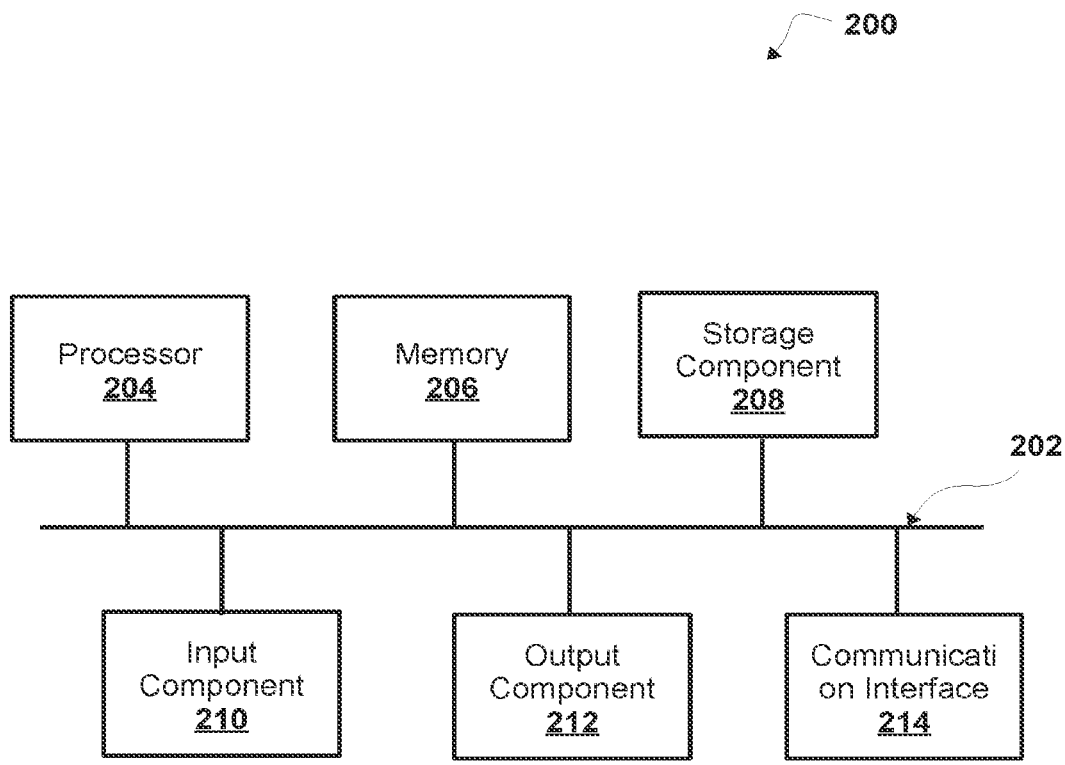
FIG. 2 is a diagram of a non-limiting embodiment or aspect of components of one or more devices of FIGS. 1A, 1B, and 1C.

Referring now to FIG. 2, FIG. 2 is a diagram of example components of a device 200. Device 200 may correspond to one or more devices of flow sensor 102, one or more devices of first sensor 106, one or more devices of second sensor 108, one or more devices of fluid identification system 110, and/or one or more devices of remote system 114. In some non-limiting embodiments or aspects, flow sensor 102, first sensor 106, second sensor 108, fluid identification system 110, and/or remote system 114 can include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
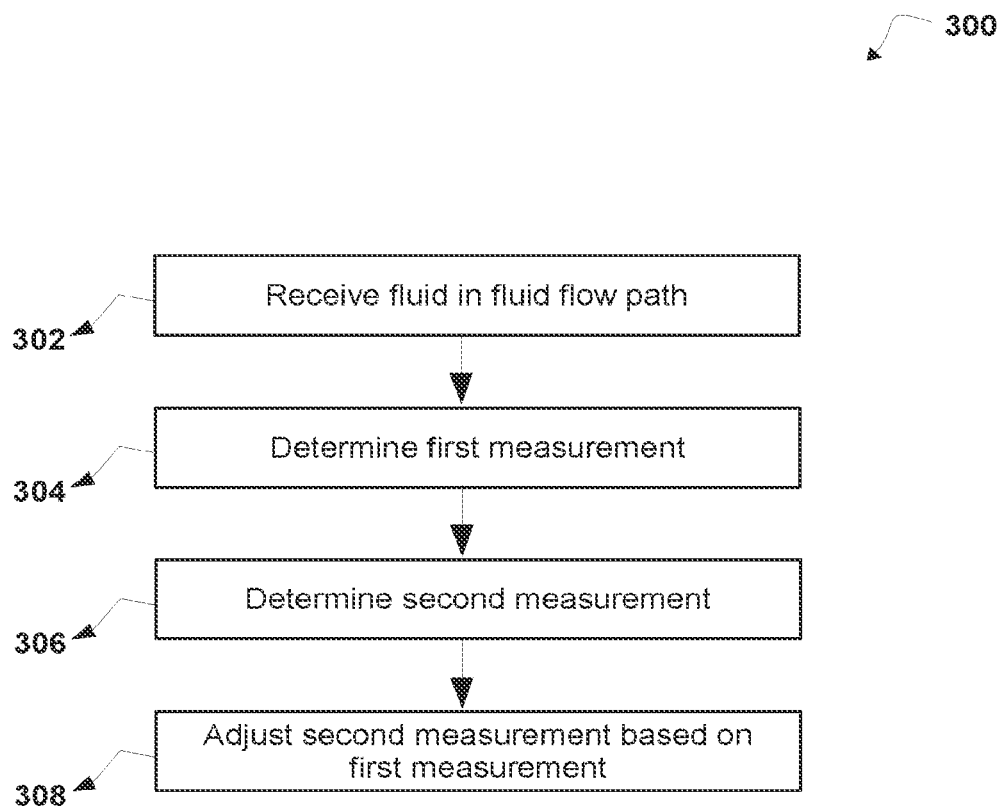
FIG. 3 is a flowchart of a non-limiting embodiment or aspect of a process for adjusting a fluid flow measurement.

Referring now to FIG. 3, FIG. 3 is a flowchart of a non-limiting embodiment or aspect of a process 300 for adjusting a fluid flow measurement. In some non-limiting embodiments or aspects, one or more of the steps of process 300 may be performed (e.g., completely, partially, etc.) by flow sensor 102 (e.g., one or more devices of flow sensor 102, such as first sensor 106, second sensor 108, and/or the like). In some non-limiting embodiments or aspects, one or more of the steps of process 300 may be performed (e.g., completely, partially, etc.) by another device or a group of devices separate from or including flow sensor 102, such as fluid identification system 110 (e.g., one or more devices of fluid identification system 110) and/or remote system 114 (e.g., one or more devices of remote system 114).

As shown in FIG. 3, at step 302, process 300 includes receiving fluid in a fluid flow path of a flow sensor. For example, flow sensor 102 receives fluid in fluid flow path 104. As an example, the fluid in the fluid flow path may include a medication fluid, an IV therapy fluid, blood, and/or the like As further shown in FIG. 3, at step 304, process 300 includes determining a first measurement of at least one of a thermal diffusivity of the fluid in the fluid flow path and a viscosity of the fluid in the fluid flow path. For example, first sensor 106 determines a first measurement of at least one of a thermal diffusivity of the fluid in fluid flow path 104 and a viscosity of the fluid in fluid flow path 104. As an example, first sensor 106 senses or measures at least one of a thermal diffusivity of the fluid in fluid flow path 104 and a viscosity of the fluid in fluid flow path 104.

In some non-limiting embodiments or aspects, first sensor 106 measures a thermal diffusivity of the fluid in fluid flow path 104, which is a relevant parameter for calibration of a calorimetric or dual-mode calorimetric/thermal time-of-flight sensor or chip. Thermal diffusivity α of a fluid may be defined according to the following Equation (1):

$$\alpha = k/\rho * Cp \quad (1)$$

where k=thermal conductivity (e.g., W/m K), ρ=density (e.g., kg/m³), and Cp=specific heat capacity (e.g., J/kg K). For example, a model of an impact of a variation in thermal diffusivity on an accuracy of thermal flow sensors is described in Steven Bindels, "Dependency of the Thermal Fluid Properties on Fluid Flow Sensor", report on Masters Internship at Philips Research, BMTE 09.46 Eindhoven University of Technology and Philips-Eindhoven. Eindhoven, The Netherlands. November 2009 (hereinafter "Bindels"), the entire contents of which is hereby incorporated by reference.

In some non-limiting embodiments or aspects, first sensor 106 measures a viscosity of the fluid in fluid flow path 104, which is a relevant parameter for calibration of a calorimetric or dual-mode calorimetric/thermal time-of-flight sensor or chip. Viscosity of a fluid may be defined as described herein below in more detail with respect to FIG. 1C. For example, a model of an impact of a variation in viscosity on an accuracy of thermal flow sensors is described Bindels.

In some non-limiting embodiments or aspects, first sensor 106 provides the first measurement to second sensor 108, fluid identification system 110, and/or remote system 114, and second sensor 108, fluid identification system 110, and/or remote system 114 receives the first measurement from first sensor 106.

As further shown in FIG. 3, at step 306, process 300 includes determining a second measurement of at least one of a fluid flow velocity of the fluid in the fluid flow path and a volumetric flow rate of the fluid in the fluid flow path. For example, second sensor 108 determines a second measurement of at least one of a fluid flow velocity of the fluid in fluid flow path 104 and a volumetric flow rate of the fluid in fluid flow path 104. As an example, second sensor 108 senses or measures at least one of a fluid flow velocity of the fluid in fluid flow path 104 and a volumetric flow rate of the fluid in fluid flow path 104.

In some non-limiting embodiment or aspects, determining the second measurement is based on at least one of a calorimetric mode of second sensor 108 and a thermal time-of-flight mode of second sensor 108. For example, second sensor 108 measures at least one of a fluid flow velocity of the fluid in fluid flow path 104 and a volumetric flow rate of the fluid in fluid flow path 104 in at least one of a calorimetric mode (e.g., using calorimetric measurements and/or properties, etc.) and a thermal time-of-flight mode (e.g., using thermal time-of-flight measurements and/or properties, etc.).

In some non-limiting embodiments or aspects, second sensor 108 provides the second measurement to first sensor 106, fluid identification system 110, and/or remote system 114, and first sensor 106, fluid identification system 110, and/or remote system 114 receives the second measurement from second sensor 108.

As further shown in FIG. 3, at step 308, process 300 includes adjusting the second measurement based on the first measurement. For example, first sensor 106, second sensor 108, fluid identification system 110, and/or remote system 114 adjusts the second measurement based on the first measurement. As an example, first sensor 106, second sensor 108, fluid identification system 110, and/or remote system 114 adjusts the second measurement based on the first measurement in real-time (e.g., during the flow of the fluid in fluid flow path 104 from which the first measurement and the second measurement are determined, etc.).

In some non-limiting embodiments or aspects, a calibration accuracy of second sensor 108 (e.g., an accuracy of flow rate measurements by second sensor 108, etc.) is impacted to varying degrees by differences in thermal diffusivity and viscosity between the fluid in fluid flow path 104 (e.g., a fluid under test, etc.) and a particular fluid with which second sensor 108 is calibrated. As an example, if second sensor 108 is calibrated for flow measurement with a particular fluid (e.g. water, a first type of medication fluid, etc.) and flow measurement of a different fluid (e.g., a medication fluid, a different type of medication fluid, etc.) is desired or performed, the flow measurement calibration of second sensor 108 can be adjusted or corrected by using the thermal diffusivity measurement and/or the viscosity measurement of the fluid in fluid flow path 104 measured by first sensor 106 to adjust or correct a fluid flow velocity measurement and/or a volumetric flow rate measurement of the fluid in the fluid flow path 104 measured by second sensor 108. In such an example, the second measurement by second sensor 108 can be adjusted based on a ratio of the at least one of the thermal diffusivity of the fluid in fluid flow path 104 (e.g., the fluid under test, etc.) and the viscosity of the fluid in fluid flow path 104 (e.g., the fluid under test, etc.) to at least one of a thermal diffusivity of the particular calibration fluid and a viscosity of the particular calibration fluid.

In some non-limiting embodiments or aspects, a fluid flow velocity of the fluid in fluid flow path 104 and/or a volumetric flow rate of the fluid in the fluid flow path 104 measured by second sensor 108 is adjusted or corrected based on one or more theoretical models of an impact of thermal properties of fluids on flow rate measurements by calorimetric or dual-mode calorimetric/thermal time-of-flight flow sensors as described in C. J. Hepp et al., "Design and Characterization of a Thermal Sensor Achieving Simultaneous Measurement of Thermal Conductivity and Flow Speed", Transducers 2015, Anchorage, Ak., USA, Jun. 21-25, 2015; J. E. Hardy et al., "Empirical Correlations for Thermal Flowmeters Covering a Wide Range of Thermal-Physical Properties", National Conference of Standard Labs 1999 Workshop and Symposium, Charlotte, N.C.; and M. A. Repko, "Automatic Thermal Conductivity Compensation for Fluid Flow Sensing Using Chemometrics" U.S. Pat. No. 7,127,366. Oct. 24, 2006, each of which is hereby incorporated by reference in its entirety. For example, one or more of these described models of the impact of thermal properties of fluids on flow rate measurements can be applied to implement an adjustment or correction in the second measurement from second sensor 108 (e.g., an adjustment or correction to a volumetric flow rate measurement received from second sensor 108, an adjustment or correction in flow sensor firmware/software of second sensor 108 used to determine and/or process the second measurement, etc.) based upon a ratio of the thermal diffusivity (and/or thermal conductivity) of the fluid in fluid flow path 104 (e.g., the fluid under test) to the thermal diffusivity (and/or thermal conductivity) of the particular fluid for which the second sensor 108 is calibrated. In such an example, an impact of physical properties of a fluid on the flow measurement process of calorimetric and thermal time-of-flight flow sensors, which can be applied to adjust a fluid flow velocity of the fluid in fluid flow path 104 and/or a volumetric flow rate of the fluid in the fluid flow path 104 measured by second sensor 108, is described in sections 2.1.2 and 2.1.3 of J. T. W. Kuo, Lawrence Yu, Ellis Meng, "Micromachined Thermal Flow Sensors—A Review", Micromachines, Volume 3, pp. 550-573 (2012) (hereinafter "Kuo"), the entire contents of which is hereby incorporated by reference. In some non-limiting embodiments, an impact of a boundary layer thickness, which is a function of viscosity, for a calorimetric flow sensor, which is described in in section 2.1.2 of Kuo, can be applied to adjust a fluid flow velocity of the fluid in fluid flow path 104 and/or a volumetric flow rate of the fluid in the fluid flow path 104 measured by second sensor 108.

Figure 1C:
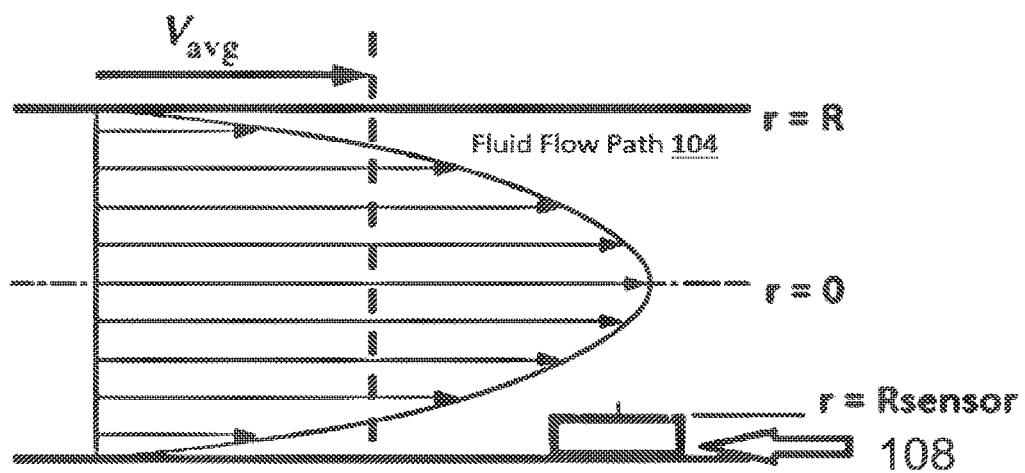
FIG. 1C is a diagram of a non-limiting embodiment or aspect of an ideal parabolic laminar flow velocity profile in a fluid flow path of a flow sensor of FIG. 1A.

In some non-limiting embodiment or aspects, a fluid flow velocity of the fluid in fluid flow path 104 and/or a volumetric flow rate of the fluid in the fluid flow path 104 measured by second sensor 108 is adjusted or corrected based on one or more fluid mechanics principles applied to implement an adjustment or correction in the second measurement by second sensor 108 (e.g., an adjustment or correction to a volumetric flow rate measurement received from second sensor 108, an adjustment or correction in flow sensor firmware/software of second sensor 108, etc.) based on a viscosity of the fluid in fluid flow path 104 (e.g., the fluid under test) measured by first sensor 106. For example, second sensor 108, such as a thermal flow sensor (e.g., a calorimetric and/or thermal time-of-flight flow sensor, etc.) may measure flow velocity at a point relatively far from a center of a flow channel (which may be cylindrical or of square, rectangular or other cross section) and provide a volumetric flow rate via a calibration which is performed for a particular calibration fluid. As an example, in a more simple case of fully developed laminar flow in a cylindrical flow path, as shown in FIG. 1C and discussed in more detail herein below, the laminar flow velocity profile is a parabolic function of radial position from the center of the flow channel or "pipe" (e.g., the cylindrical flow sensor's region of flow sensing, etc.) and the flow velocity at the position of the flow sensor MEMS chip surface, the mean and maximum flow velocity, and the volumetric flow rate are linearly related by the viscosity of the fluid. Thus, when a volumetric flow rate of a fluid other than that for which the sensor is calibrated is desired or measured, the measured viscosity from the MEMS viscosity sensor (e.g., first sensor 106, etc.) can be used to linearly adjust the volumetric flow rate measurement by the flow sensor (e.g., second sensor 108, etc.) via a viscosity ratio of the fluid being measured and the calibration fluid according to equations defined below with respect to FIG. 1C.

Referring now to FIG. 1C, FIG. 1C is a diagram of a non-limiting embodiment or aspect of an ideal parabolic laminar flow velocity profile in a fluid flow path of a flow sensor of FIG. 1A. As shown in FIG. 1C, an ideal parabolic laminar flow velocity profile may exist in well-developed laminar flow in a pipe or tubing (e.g., in a cylindrical flow path) of radius R. Second sensor 108 may be configured to measure a flow velocity at a surface of second sensor 108 at radial position r=$R_{sensor}$. Due to a no-slip velocity condition, second sensor 108 may not be flush with the wall of fluid flow path 104. A flow velocity V($R_{sensor}$) measured at second sensor 108 at radial position r=$R_{sensor}$ can be correlated to a maximum flow velocity $V_{max}$=V(0) observed at r=0 and to a volumetric flow rate through the pipe or tubing. A flow velocity profile for fully developed laminar flow in the pipe of radius R can be defined according to the following Equation (2):

$$V(r) = V_{max}[1 - (r/R)^2] \quad (2)$$

where $V_{max}$=2*$V_{avg}$, $V_{avg}$=an average flow velocity of the laminar flow, $V_{max}$=[(a pressure drop along a length L of the pipe)*$R^2$/4*(viscosity)*(L) and is a centerline velocity of the laminar flow, and a volumetric flow rate Q for the fully developed laminar flow in the pipe of radius R can be defined according to the following Equation (3):

$$Q = (\pi)*R^2*V_{max}/2 \quad (3)$$

In some non-limiting embodiments or aspects, if second sensor 108 (e.g., a MEMS thermal flow sensor chip, etc.) is located in an area or zone of fluid flow path 104 at which laminar flow is not fully developed (e.g., within a entrance length region where a velocity boundary layer exists, etc.) mathematics of the relationship between the measured fluid viscosity, the measured fluid velocity at the surface of the MEMS thermal flow sensor chip, and an adjustment or correction to the volumetric flow rate relative to the volumetric flow rate the flow sensor calculates based upon its calibration with a fluid of a different viscosity than the fluid flowing through fluid flow path 104 are more complicated than in the ideal laminar flow case described herein with respect to FIG. 1C, but the concept of an adjustment or correction mechanism based on a viscosity measurement is similar and not described herein in detail in the interest of brevity.

In some non-limiting embodiments or aspects, a fluid flow velocity of the fluid in fluid flow path 104 and/or a volumetric flow rate of the fluid in the fluid flow path 104 measured by second sensor 108 is adjusted or corrected based a combination of a thermal property measurement by first sensor 106 and a viscosity measurement by first sensor 106. For example, first sensor 106 may include a thermal property MEMs chip and a viscosity measurement MEMs chip. As an example, a fluid flow velocity of the fluid in fluid flow path 104 and/or a volumetric flow rate of the fluid in the fluid flow path 104 measured by second sensor 108 can be adjusted or corrected based on the thermal diffusivity ratios and the viscosity ratios between the fluid under test and the calibration fluid as described herein and/or one or more models of an impact of physical properties of a fluid on a flow measurement process of calorimetric and/or thermal time-of-flight sensors as described in Kuo.

In some non-limiting embodiments or aspects, adjusting the second measurement includes controlling second sensor 108 to switch, based on the first measurement, between (i) determining the second measurement based on only the calorimetric mode and (ii) determining the second measurement based on only the thermal time-of-flight mode. In some non-limiting embodiment or aspects, adjusting the second measurement includes controlling second sensor 108 to switch, based on the first measurement, between (i) determining the second measurement based on only one of the calorimetric mode and the thermal time-of-flight mode and (ii) determining the second measurement based on each of the calorimetric mode and the thermal time-of-flight mode. For example, measured thermal properties of the fluid and/or measured viscosity of the fluid can be used to determine an appropriate point in time to switch from utilization of a calorimetric mode to utilization of a thermal time-of-flight mode for a dual mode sensor if only one of these modes is used to determine a flow rate measurement at a time, or to combine information from these two modes in a fashion which calculates a more accurate flow velocity and volumetric flow rate passing through flow sensor 102. The determination of the switch point and/or volumetric flow rate adjustment or correction can be based upon empirical data/measurements of impact of differences between the thermal diffusivity (and/or thermal conductivity) of the fluid under test relative to the thermal diffusivity (and/or thermal conductivity) of the flow sensor calibration fluid and/or viscosity of the fluid under test relative to the viscosity of the flow sensor calibration fluid on volumetric flow rate measurement (of either a calorimetric only mode flow sensor or a dual mode calorimetric/thermal time-of-flight thermal flow sensor), and an optimal switch point between the calorimetric and thermal-time-of-flight modes for a dual mode thermal flow sensor.

In some non-limiting embodiments or aspects, flow sensor 102 and/or remote system 114 provides adjusted data as output via output component 212, (e.g., via a display of the adjusted second measurement, etc.), wherein the adjusted data is based on the adjusted second measurement. In some non-limiting embodiments or aspects, first sensor 106, second sensor 108, fluid identification system 110, and/or remote system 114 controls delivery of the fluid to and/or from flow sensor 102 (and/or to and/or from another fluid delivery device through which the fluid flows, to and/or from a patient, etc.) based on the adjusted second measurement. For example, first sensor 106, second sensor 108, fluid identification system 110, and/or remote system 114 controls one or more valves and/or one or more fluid delivery pumps to modify the flow of the fluid in fluid flow path 104 based on the adjusted second measurement.

Further details regarding step 308 of process 300 are provided below with regard to FIG. 4.

Figure 4:
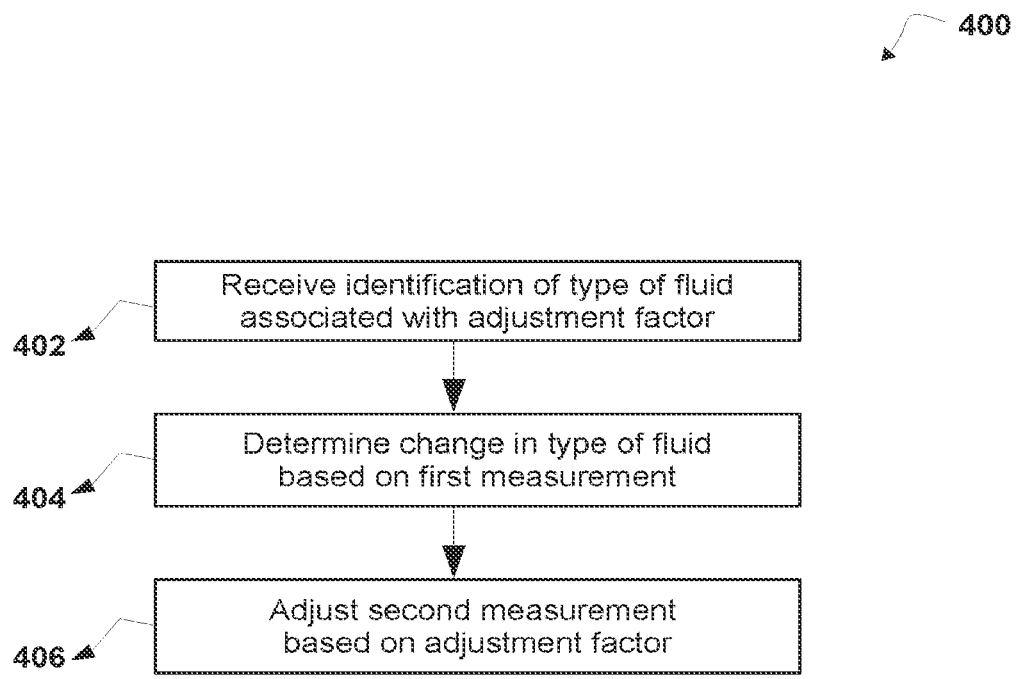
FIG. 4 is a flowchart of a non-limiting embodiment or aspect of a process for adjusting a fluid flow measurement.

Referring now to FIG. 4, FIG. 4 is a flowchart of a non-limiting embodiment or aspect of a process 400 for adjusting a fluid flow measurement. In some non-limiting embodiments or aspects, one or more of the steps of process 400 may be performed (e.g., completely, partially, etc.) by flow sensor 102 (e.g., one or more devices of flow sensor 102, such as first sensor 106, second sensor 108, and/or the like). In some non-limiting embodiments or aspects, one or more of the steps of process 400 may be performed (e.g., completely, partially, etc.) by another device or a group of devices separate from or including flow sensor 102, such as fluid identification system 110 (e.g., one or more devices of fluid identification system 110) and/or remote system 114 (e.g., one or more devices of remote system 114).

As shown in FIG. 4, at step 402, process 400 includes receiving an identification of a type of the fluid to be received in the fluid flow path. For example, first sensor 106, second sensor 108, fluid identification system 110, and/or remote system 114 receives an identification of a type of fluid to be received in fluid flow path 104. In some non-limiting embodiments or aspects, the identification is associated with an adjustment factor. For example, an adjustment factor may include a predetermined adjustment or correction to be applied to a fluid flow velocity of the fluid in fluid flow path 104 and/or a volumetric flow rate of the fluid in the fluid flow path 104 measured by second sensor 108 for the type of the identified fluid. As an example, the adjustment factor may be based on previous empirically based or theoretical calculation/modeling based determinations for measurement of the identified type of fluid in flow sensor 102.

In some non-limiting embodiments or aspects, fluid identification system 110 identifies the type of fluid to be received and/or currently in fluid flow path 104 and provides the identification of the type of fluid to first sensor 106, second sensor 108, and/or remote system 114.

As further shown in FIG. 4, at step 404, process 400 includes determining, based on the first measurement, a change in the type of the fluid in the fluid flow path. For example, first sensor 106, second sensor 108, fluid identification system 110, and/or remote system 114 determines, based on the first measurement, a change in the type of fluid in fluid flow path 104. As an example, flow sensor 102 can be used in a dynamic manner with multiple different types of fluid passing through flow sensor 102 and a thermal diffusivity measurement and/or a viscosity measurement by first sensor 106 (e.g., a change in the thermal diffusivity measurement and/or the viscosity measurement that satisfies one or more thresholds, etc.) can be used to determine that a different or new fluid is entering fluid flow path 104 (e.g., a flow sensing area or region of fluid flow path 104 including second sensor 108, etc.). In such an example, the identification associated with the adjustment factor for the different or new fluid can be used to alert flow sensor 102 that a change in the type of the fluid in the fluid flow path is about to occur, and the measured thermal diffusivity change (and/or thermal conductivity change) and/or the measured viscosity change from first sensor 106 can be used by flow sensor 102 to identify the particular point in time at which the fluid front of the different or new fluid has entered fluid flow path 104 (e.g., the flow sensing area or region, etc.).

As further shown in FIG. 4, at step 406, process 400 includes, in response to determining the change in the type of the fluid in the fluid flow path, adjusting the second measurement based on the adjustment factor. For example, first sensor 106, second sensor 108, fluid identification system 110, and/or remote system 114, in response to determining the change in the type of the fluid in fluid flow path 104, adjusts the second measurement based on the adjustment factor. As an example, in response to the measured thermal diffusivity change (and/or thermal conductivity change) and/or the measured viscosity change from first sensor 106, second sensor 108 can apply an appropriate empirical and/or theoretical volumetric flow rate measurement adjustment or correction for the new or different fluid that has entered fluid flow path 104 based on the adjustment factor associated with the new or different fluid. In such an example, second sensor 108 (e.g., a dual-mode calorimetric/thermal time-of-flight flow sensor, etc.) may have different optimal switch points between calorimetric and thermal time-of-flight operation modes for fluids of different thermal diffusivities and/or different viscosities to maximize or optimize volumetric flow rate measurement performance (e.g., an accuracy of flow measurements, a response time of flow measurements, etc.) As an example, the thermal diffusivity measurement and/or the viscosity measurement can be combined with the adjustment factor to determine a calorimetric/time-of-flight mode switch point for second sensor 108 for the new or different fluid from previous empirically based or theoretical calculation/modeling based determinations of what that thermal optimum flow sensor measurement mode switch point would be for that particular fluid (e.g., if exact fluid identity is known) or for a fluid of that particular thermal diffusivity (and/or thermal conductivity) and/or viscosity.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment or aspect can be combined with one or more features of any other embodiment or aspect.

What is claimed is:

1. A flow sensor comprising:
   a fluid flow path;
   a first sensor configured to determine a first measurement of at least one of a thermal diffusivity of a fluid in the fluid flow path and a viscosity of the fluid in the fluid flow path;
   a second sensor configured to determine a second measurement of at least one of a fluid flow velocity of the fluid in the fluid flow path and a volumetric flow rate of the fluid in the fluid flow path; and
   at least one processor configured to adjust the second measurement based on the first measurement, wherein the second sensor is spaced apart from the first sensor in a fluid flow direction of the fluid flow path,
   wherein the first sensor includes a resistive heater layer extending in a direction parallel to the fluid flow path between a first resistive temperature detector layer and a second resistive temperature detector layer extending in the direction parallel to the fluid flow path, wherein the second sensor includes another resistive heater layer extending in a direction perpendicular to the fluid flow path between another first resistive temperature detector layer and another second resistive temperature detector layer extending in the direction perpendicular to the fluid flow path, and wherein a spacing between the resistive heater layer and the first resistive temperature detector layer and the second resistive temperature detector layer in the first sensor is less than a spacing between the another resistive heater layer and the another first resistive temperature detector layer and the another second resistive temperature detector layer in the second sensor.

2. The flow sensor of claim 1, wherein the second sensor is configured to determine the second measurement based on at least one of a calorimetric mode and a thermal time-of-flight mode.

3. The flow sensor of claim 2, wherein the at least one processor is configured to adjust the second measurement by controlling the second sensor to switch, based on the first measurement, between (i) determining the second measurement based on only the calorimetric mode and (ii) determining the second measurement based on only the thermal time-of-flight mode.

4. The flow sensor of claim 2, wherein the at least one processor is configured to adjust the second measurement by controlling the second sensor to switch, based on the first measurement, between (i) determining the second measurement based on only one of the calorimetric mode and the thermal time-of-flight mode and (ii) determining the second measurement based on each of the calorimetric mode and the thermal time-of-flight mode.

5. The flow sensor of claim 1, wherein the second sensor is calibrated to determine the second measurement for a first type of the fluid, wherein the fluid includes a second type of the fluid different than the first type of the fluid, and wherein the at least one processor is configured to adjust the second measurement based on a ratio of the at least one of the thermal diffusivity of the fluid in the fluid flow path and the viscosity of the fluid in the fluid flow path to at least one of a thermal diffusivity of the first type of the fluid and a viscosity of the first type of the fluid.

6. The flow sensor of claim 1, wherein the at least one processor is configured to:
   receive an identification of a type of the fluid to be received in the fluid flow path, wherein the identification is associated with an adjustment factor;
   determine, based on the first measurement, a change in the type of the fluid in the fluid flow path; and
   in response to determining the change in the type of the fluid in the fluid flow path, adjust the second measurement based on the adjustment factor.

7. The flow sensor of claim 6, further comprising:
   a third sensor configured to identify the type of the fluid in the fluid flow path and provide the identification of the type of the fluid in the fluid flow path.

8. The flow sensor of claim 1, wherein the fluid in the fluid flow path flows over or past the first sensor before the fluid in fluid flow path flows over or past the second sensor.

9. A method comprising:
   receiving fluid in a fluid flow path of a flow sensor;
   determining, with a first sensor of the flow sensor, a first measurement of at least one of a thermal diffusivity of the fluid in the fluid flow path and a viscosity of the fluid in the fluid flow path;
   determining, with a second sensor of the flow sensor, a second measurement of at least one of a fluid flow velocity of the fluid in the fluid flow path and a volumetric flow rate of the fluid in the fluid flow path; and adjusting, with at least one processor, the second measurement based on the first measurement, wherein the second sensor is spaced apart from the first sensor in a fluid flow direction of the fluid flow path, wherein the first sensor includes a resistive heater layer extending in a direction parallel to the fluid flow path between a first resistive temperature detector layer and a second resistive temperature detector layer extending in the direction parallel to the fluid flow path, wherein the second sensor includes another resistive heater layer extending in a direction perpendicular to the fluid flow path between another first resistive temperature detector layer and another second resistive temperature detector layer extending in the direction perpendicular to the fluid flow path, and wherein a spacing between the resistive heater layer and the first resistive temperature detector layer and the second resistive temperature detector layer in the first sensor is less than a spacing between the another resistive heater layer and the another first resistive temperature detector layer and the another second resistive temperature detector layer in the second sensor.

10. The method of claim 9, wherein determining the second measurement is based on at least one of a calorimetric mode of the second sensor and a thermal time-of-flight mode of the second sensor.

11. The method of claim 10, wherein adjusting the second measurement includes controlling the second sensor to switch, based on the first measurement, between (i) determining the second measurement based on only the calorimetric mode and (ii) determining the second measurement based on only the thermal time-of-flight mode.

12. The method of claim 10, wherein adjusting the second measurement includes controlling the second sensor to switch, based on the first measurement, between (i) determining the second measurement based on only one of the calorimetric mode and the thermal time-of-flight mode and (ii) determining the second measurement based on each of the calorimetric mode and the thermal time-of-flight mode.

13. The method of claim 9, wherein the second sensor is calibrated to determine the second measurement for a first type of the fluid, wherein the fluid includes a second type of the fluid different than the first type of the fluid, and wherein adjusting the second measurement is based on a ratio of the at least one of the thermal diffusivity of the fluid in the fluid flow path and the viscosity of the fluid in the fluid flow path to at least one of a thermal diffusivity of the first type of the fluid and a viscosity of the first type of the fluid.

14. The method of claim 9, further comprising:
receiving, with the at least one processor, an identification of a type of the fluid to be received in the fluid flow path, wherein the identification is associated with an adjustment factor;
determining, with the at least one processor, based on the first measurement, a change in the type of the fluid in the fluid flow path; and
in response to determining the change in the type of the fluid in the fluid flow path, adjusting, with the at least one processor, the second measurement based on the adjustment factor.

15. The method of claim 14, further comprising:
identifying, with a third sensor, the type of the fluid in the fluid flow path; and
providing, with the third sensor, the identification of the type of the fluid in the fluid flow path.

16. The method of claim 9, wherein the fluid in the fluid flow path flows over or past the first sensor before the fluid in fluid flow path flows over or past the second sensor.

* * * * *